(12) United States Patent
Walker et al.

(10) Patent No.: US 7,433,451 B2
(45) Date of Patent: *Oct. 7, 2008

(54) SYSTEM AND METHOD FOR FACILITATING ACCOUNT-BASED TRANSACTIONS

(75) Inventors: Jay S. Walker, Ridgefield, CT (US); Daniel E. Tedesco, Huntington, CT (US); Andrew S. Van Luchene, New York, NY (US); James A. Jorasch, Stamford, CT (US)

(73) Assignee: Walker Digital, LLC, Stamford, CT (US)

( * ) Notice: Subject to any disclaimer, the term of this patent is extended or adjusted under 35 U.S.C. 154(b) by 1161 days.

This patent is subject to a terminal disclaimer.

(21) Appl. No.: 10/603,110

(22) Filed: Jun. 24, 2003

(65) Prior Publication Data

US 2004/0030654 A1   Feb. 12, 2004

Related U.S. Application Data

(63) Continuation-in-part of application No. 09/994,569, filed on Nov. 27, 2001, now Pat. No. 6,597,770, which is a continuation-in-part of application No. 09/417,182, filed on Oct. 12, 1999, now Pat. No. 6,327,348, which is a continuation of application No. 09/036,131, filed on Mar. 6, 1998, now Pat. No. 5,999,596.

(51) Int. Cl.
*H04M 11/00* (2006.01)

(52) U.S. Cl. .................................................. 379/90.01

(58) Field of Classification Search ............ 379/114.03, 379/114.1, 114.05–127.05, 100.3, 93.02, 379/39.12, 91.01, 265.01, 91.02, 93.04, 93.12; 705/53, 75, 76, 77, 78, 79, 130, 34.1, 40, 705/400, 418, 44, 43

See application file for complete search history.

(56) References Cited

U.S. PATENT DOCUMENTS

| | | | | |
|---|---|---|---|---|
| 3,793,624 A | * | 2/1974 | Vaskunas et al. | 379/91.01 |
| 4,837,422 A | * | 6/1989 | Dethloff et al. | 235/380 |
| 4,847,890 A | * | 7/1989 | Solomon et al. | 379/88.21 |
| 4,891,503 A | * | 1/1990 | Jewell | 235/380 |
| 5,226,073 A | | 7/1993 | Albal et al. | 379/91 |
| 5,319,701 A | * | 6/1994 | Hird et al. | 379/92.01 |
| 5,485,510 A | | 1/1996 | Colbert | 379/145 |

(Continued)

FOREIGN PATENT DOCUMENTS

WO   WO 03/083737 A1   10/2003

OTHER PUBLICATIONS

"Trends in E-Commerce Probed at Comdex Session Nov. 22, 1996", Newsbytes, Nov. 22, 1996.

(Continued)

*Primary Examiner*—Curtis Kuntz
*Assistant Examiner*—Maria El-Zoobi

(57) ABSTRACT

One embodiment of the present invention comprises associating a first person with an account, associating a second person with the account, receiving a request to authorize a transaction between the second person and a third party, and enabling communication between the first person and the second person.

22 Claims, 8 Drawing Sheets

U.S. PATENT DOCUMENTS

| | | | | |
|---|---|---|---|---|
| 5,521,966 | A | | 5/1996 | Friedes et al. ............... 379/91 |
| 5,530,438 | A | * | 6/1996 | Bickham et al. ............. 705/44 |
| 5,539,189 | A | * | 7/1996 | Wilson ...................... 235/375 |
| 5,615,110 | A | * | 3/1997 | Wong ...................... 379/93.02 |
| 5,621,201 | A | | 4/1997 | Langhans et al. .......... 235/380 |
| 5,655,007 | A | | 8/1997 | McAllister ............. 379/91.01 |
| 5,708,422 | A | * | 1/1998 | Blonder et al. ......... 379/114.15 |
| 5,745,554 | A | | 4/1998 | Rozetti ................... 379/91.02 |
| 5,903,830 | A | | 5/1999 | Joao et al. |
| 5,914,472 | A | * | 6/1999 | Foladare et al. ............... 705/35 |
| 5,953,710 | A | | 9/1999 | Fleming |
| 5,999,596 | A | * | 12/1999 | Walker et al. ............ 379/91.01 |
| 6,081,792 | A | * | 6/2000 | Cucinotta et al. ............. 705/43 |
| 6,327,348 | B1 | | 12/2001 | Walker et al. ............ 379/91.01 |

OTHER PUBLICATIONS

Karve, Anita, "Internet Commerce Makes the Sale, Part 1", Network, May 1997, vol. 12, No. 5, p. 79.

* cited by examiner

CREDIT CARD ACCOUNT DATABASE 200

| ACCOUNT IDENTIFIER 200A | ACCOUNT HOLDER'S NAME 200B | ACCOUNT HOLDER'S ADDRESS 200C | ORIGINAL CREDIT LINE 200D | AVAILABLE CREDIT LINE 200E |
|---|---|---|---|---|
| 2222-3333-4444-5555 | TIM JOHNSON | 99 MAIN ST. HOMETOWN, CT 22222 | $5,000 | $2,000 |
| 2222-8888-7777-6666 | SUE MARVIN | 10 CENTER ST. ROCKPORT, NJ 99999 | $4,000 | $3,500 |

MERCHANT DATABASE 300

| MERCHANT IDENTIFIER 300A | CARD AUTHORIZATION TERMINAL (CAT) IDENTIFIER 300B | CARD AUTHORIZATION TERMINAL CONTACT PHONE NUMBER(S) 300C | MERCHANT NAME 300D |
|---|---|---|---|
| 12345 | 123-XYZ | (333)444-5555 | ABC DRUG STORE |
| 67890 | 456-STX | (999)111-2222<br>(666)777-8888 | SHOE EXPRESS |

R3 — row 1
R4 — row 2

FIG. 4

| USER IDENTIFIER 400A | ACCOUNT IDENTIFIER 400B | USAGE FEE 400C | USER NAME 400D | ACCOUNT HOLDER'S TELEPHONE NUMBER 400E | AUTOMATIC DEFAULT TIME 400F | AUTOMATIC DEFAULT COMMAND 400G |
|---|---|---|---|---|---|---|
| 2222-3333-4141-5151 | 2222-3333-4444-5555 | $20 | JOE SMITH | (111)222-3333 | 2.0 MIN | AUTHORIZE |
| 2222-8888-7171-6161 | 9999-8888-7777-6666 | $25 | JANE DOE | (444)555-6666 | 2.5 MIN | DECLINE |

USER DATABASE 400

FIG. 5

TRANSACTION DATABASE 500

| USER/ACCOUNT IDENTIFIER 500A | AUTHORIZATION CODE 500B | RECORD OF CHARGE IDENTIFIER 500C | TRANSACTION AMOUNT 500D | CHARGE DESCRIPTION 500E | MERCHANT IDENTIFIER 500F | CAT IDENTIFIER 500G |
|---|---|---|---|---|---|---|
| 2222-3333-4141-5151 | 777777 | 92929292 | $250.38 | ABC DRUG STORE | 12345 | 123-XYZ |
| 2222-3333-4141-5151 | 777777 | 92929292 | $20.00 | EMERGENCY CARD USAGE FEE | 12345 | 123-XYZ |
| 2222-8888-7777-6666 | 777772 | 665544 | $50.95 | SHOE EXPRESS | 67890 | 456-STX |

SYSTEM AND METHOD FOR FACILITATING ACCOUNT-BASED TRANSACTIONS

CROSS-REFERENCE TO RELATED APPLICATIONS

This application is a continuation-in-part of U.S. patent application Ser. No. 09/994,569 entitled "METHOD AND SYSTEM FOR AUTHORIZATION OF ACCOUNT-BASED TRANSACTIONS" filed in the name of Jay S. Walker, Daniel E. Tedesco, Andrew S. Van Luchene, and James A. Jorasch on Nov. 27, 2001, and issued on Jul. 23, 2003 as U.S. Pat. No. 6,597,770; which is a continuation-in-part of U.S. patent application Ser. No. 09/417,182 entitled "METHOD AND SYSTEM FOR CONTROLLING AUTHORIZATION OF CREDIT CARD TRANSACTIONS" filed in the name of Jay S. Walker, Daniel E. Tedesco, Andrew S. Van Luchene and James A. Jorasch on Oct. 12, 1999, and issued on Dec. 4, 2001 as U.S. Pat. No. 6,327,348; which is a continuation of U.S. patent application Ser. No. 09/036,131 entitled "METHOD AND SYSTEM FOR CONTROLLING AUTHORIZATION OF CREDIT CARD TRANSACTIONS" filed in the name of Jay S. Walker, Daniel E. Tedesco, Andrew S. Van Luchene and James A. Jorasch on Mar. 6, 1998, and issued on Dec. 7, 1999 as U.S. Pat. No. 5,999,596. Each of the above applications is incorporated herein by reference.

FIELD OF THE INVENTION

The present invention relates to a method and system for enabling a first person who holds a transaction card account to communicate with a second person who is associated with the account.

BACKGROUND OF THE INVENTION

A bank or other issuer issues transaction cards having corresponding card accounts to individuals (hereafter, "account holders"). For example, an account holder may use his credit card to purchase goods and/or services (collectively, "goods") from one or more merchants in an aggregate amount that may not exceed the credit line for the account.

It is common for an account holder to permit another person (hereafter, "user") to purchase goods using a credit card that is associated with the account holder's account. When doing so, however, it is possible that the user may abuse privileges afforded by the credit card.

BRIEF DESCRIPTION OF THE DRAWINGS

Representative embodiments of the present invention will be described with reference to the following figures:

FIG. 3 illustrates an exemplary credit card account database of the server of the apparatus of FIG. 2;

FIG. 4 illustrates an exemplary merchant database of the server of the apparatus of FIG. 2;

FIG. 5 illustrates an exemplary user database of the server of the apparatus of FIG. 2;

FIG. 6 illustrates an exemplary transaction database of the server of the apparatus of FIG. 2.

DETAILED DESCRIPTION OF THE PREFERRED EMBODIMENTS

Figure 1:
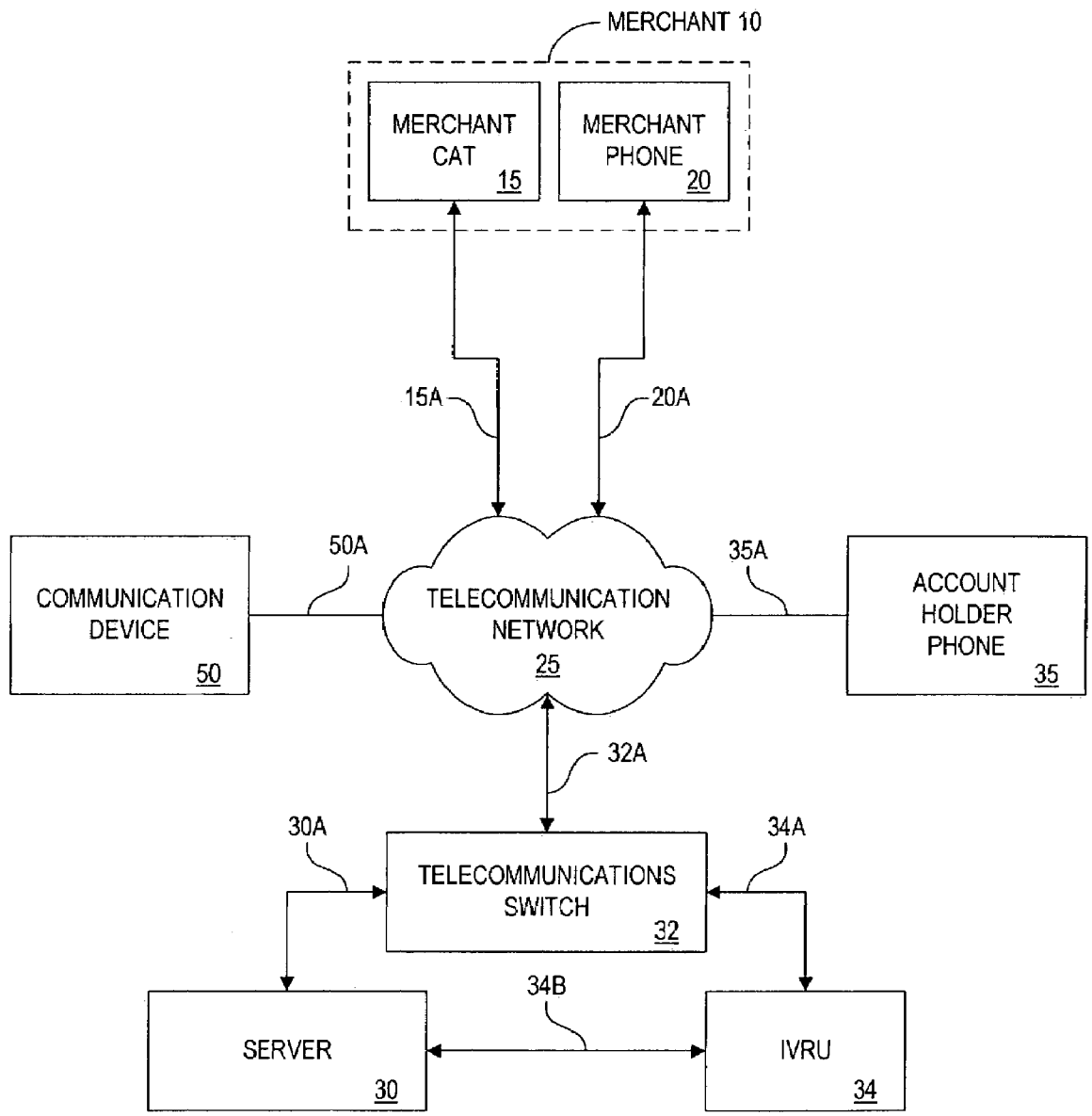
FIG. 1 is a schematic illustration of an exemplary apparatus for facilitating communication between first and second persons.

A first aspect of the present invention is directed to a method for facilitating communication between a first person and a second person. The method comprises the steps of associating the first and second persons with a financial account, receiving data identifying the financial account, inquiring whether the first person desires to communicate with the second person, receiving a response to the inquiry, and initiating communication between the first and second persons based on the response. In some embodiments, the method further includes receiving from the first person an indication of whether a transaction between the second person and a third party (e.g., a merchant) should be authorized. For example, the first person may decide to authorize such a transaction based on the communication between the first person and the second person.

A second aspect of the present invention is directed to a method for facilitating communication between a first person (e.g., an account holder) and a second person (e.g., a user) so that the first person may authorize a transaction between the second person and a third party (e.g., a merchant). The method comprises the steps of associating the first and second persons with a financial account that is used for the transaction, receiving data from the third party identifying the financial account and the third party, inquiring whether the first person desires to communicate with the second person based on the data identifying the financial account, receiving a response to the inquiry, and initiating communication between the first and second persons based on the response.

A third aspect of this invention is directed to a method for facilitating communication between first and second persons so that the first person may authorize a transaction between the second person and a third party. The method comprises the steps of associating the first and second persons with a financial account that is used for the transaction, receiving data identifying the financial account and the third party from the third party, accessing a database based on the data identifying the financial account to determine a first communication address (e.g., a telephone number; an email address) of the first person, and communicating with the first person based on the communication address to inquire whether the first person desires to communicate with the second person. At least one second communication address is determined. For example, a communication address of the third party (e.g., a merchant's telephone number) may be determined, enabling communication with the second person if the second person is at a third party's location (e.g., a merchant's store). In another example, a communication address of the second person (e.g., the second person's telephone number; an email address) may be determined. In some embodiments, communication is attempted and/or enabled between the first and second persons using the determined second communication address.

A fourth aspect of this invention is directed to a method for facilitating communication between first and second persons so that the first person may authorize a transaction between the second person and a third party. The method comprises the steps of associating the first and second persons with a financial account that is used for the transaction, receiving data identifying the financial account and the third party from the third party, accessing a database based on the data identifying the financial account to determine a telephone number of the first person, placing a telephone call to the first person based on the telephone number thereof, and inquiring whether the first person desires to communicate with the second person. If the first person responds affirmatively to the inquiry, a database is accessed based on the data identifying the third party to determine a telephone number thereof and telephonic communication is enabled between the first and second persons using the telephone number of the third party.

A fifth aspect of the present invention relates to a method for facilitating communication between an account holder and a user so that the account holder may authorize a card-based transaction between the user and a merchant. The method includes the steps of associating the account holder and the user with a financial account associated with the card that is used for the transaction, wherein the financial account is identified by an account number. The method further includes the steps of communicating with the third party to receive the account number and data identifying the third party, accessing a first database based on the account number to determine a communication address (e.g., telephone number) of the first person, and attempting to contact the first person using the communication address thereof. When the attempt to contact the first person is successful, an inquiry is made as to whether the first person desires to communicate with the second person. In response to an affirmative answer to the inquiry from the first person, a second database is accessed based on the data identifying the third party to determine a communication address thereof and communication is enabled between the first and second persons using the communication address of the third party.

A sixth aspect of this invention is directed to an apparatus for facilitating communication between a first person at a first location and a second person at a point-of-sale location so that the first person may authorize a transaction between the second person and a third party at the point-of-sale location, wherein the first and second persons are associated with a financial account used for the transaction. The apparatus includes a memory storing data identifying the financial account and the third party, a first telephone number associated with the first location, and a second telephone number associated with the point-of-sale location.

The apparatus also includes a processor in communication with the memory. The processor is adapted and configured to receive the data identifying the financial account and the third party from the third party, access the memory based on the data identifying the financial account and the third party to determine the first and second telephone numbers, transmit instructions to contact the first person based on the first telephone number, inquire whether the first person desires to communicate with the second person, and enable communication between the first and second persons based on a response to the inquiry and the second telephone number.

One or more embodiments of the present invention comprise receiving an indication of a first person; associating the first person with an account; receiving an indication of a second person; associating the second person with the account; receiving a request to authorize a transaction between the second person and a third party; determining whether the first person desires to communicate with the second person; and enabling communication between the first person and the second person if the first person desires to communicate with the second person.

Reference is now made to the accompanying Figures for the purpose of describing, in detail, the preferred embodiments of the present invention. The Figures and accompanying detailed description are provided as examples of the invention and are not intended to limit the scope of the claims appended hereto.

In accordance with the present invention, an account holder (or other authorized person) may permit a user to execute transactions with (i.e., purchase goods from) a merchant using a credit card that is associated with the account holder's credit card account. A credit card is deemed to be associated with an account if, for example, a transaction involving the credit card affects the balance of the account.

The invention allows the account holder to exercise control over the user's use of the credit card based on circumstances surrounding the transaction. This is achieved by enabling communication between the account holder and the user so that the account holder can determine the circumstances surrounding the transaction. For example, in an embodiment in which a parent permits a child to use a credit card only in emergency situations, the parent can communicate (e.g., telephonically, via video signals, via audio signals, via email, or via instant messaging) with the child to ascertain the nature of the emergency. In this way, the account holder can choose to authorize or decline the transaction based on the communication so as to effectively exercise control over the user's use of the credit card.

FIG. 1 is a schematic illustration of a system for facilitating communication between an account holder and a user so that the account holder may authorize a transaction between the user and a merchant. In this embodiment, the account holder is a parent who maintains a credit card account with an issuer. The user is a child of the parent that uses an identifier that is associated with the parent's account. Of course, in alternate embodiments an account holder may be any individual or organization who maintains a credit card account with an issuer and a user may be any individual or organization that uses a credit card that is associated with the account.

Merchant 10 is a business with whom a user executes a transaction—i.e., uses a credit card to purchase goods. Merchant 10 facilitates transactions at a point-of-sale by using a card authorization terminal ("CAT") 15, such as those well known in the art, for transmitting a purchase authorization request to server 30. As is well known in the art, a purchase authorization request includes data indicating a purchase amount for the goods, an identifier that identifies a credit card that the user is presenting for payment, an identifier that identifies a merchant 10, and an identifier that identifies CAT 15 from which the purchase authorization request is transmitted.

Merchant 10 preferably also has a telephone 20 that is accessible by a user. In this embodiment, telephone 20 is located at the point-of-sale and is in close proximity to CAT 15. In this way, a user can have unfettered access to telephone 20. Of course, other communications devices such as a computer may be readily substituted for CAT 15 and/or telephone 20 without departing from the spirit and scope of the present invention. For example, CAT 15 and telephone 20 may be combined in a single device such as the combination CAT/telephone disclosed in U.S. Pat. No. 3,793,624, the disclosure of which is incorporated herein by reference.

CAT 15 and telephone 20 are in communication with telecommunications network 25 via lines 15A and 20A, respectively. In this embodiment, telecommunications network 25 is the well-known public switched telephone network (PSTN) and lines 15A and 20A are public telephone lines. Of course, other communications networks and lines may be used as desired.

A telecommunications switch 32 (e.g., a PBX) is in communication with telecommunications network 25 via line 32A. Telecommunications switch 32 also is in communication with server 30 via line 30A and an interactive voice response unit ("IVRU") 34 via line 34A. IVRU 34 communicates with server 30 via line 34B. IVRU 34 provides an interface between server 30 and an account holder, allowing voice prompts to the account holder and transmitting signals received from the account holder to server 30, as will be further described below. Telecommunications switch 32, IVRU 34, and lines 30A, 32A, 34A, and 34B are well known and therefore are not described here further. See, for example, U.S. Pat. No. 4,847,890, the disclosure of which is incorporated herein by reference.

Server 30 includes one or more computers that are preferably located at one physical location. Alternatively, server 30 may include multiple computers that are connected via a network that spans multiple physical locations, thereby allowing the computers to communicate with each other via well-known communication techniques. In this way, as is well known in the art, memory and processing may be distributed among the computers that may make up server 30.

Server 30 is operated by or associated with an entity or organization (referred to as the "entity") that maintains data relating to account holders' credit card accounts. In the described embodiments, the entity is a credit card issuer. Of course, the entity may be a credit card processing company that operates a network for facilitating processing of credit card transactions, such as First Data Corporation.

Telephone 35 is a telephone that is capable of generating Dual Tone Multi-Frequency ("DTMF") signals, and that is accessible by an account holder (or other designated person). Telephone 35 is in communication with telecommunications network 25 via line 35A, which in this embodiment is a public telephone line. Of course, other communications devices (e.g., a desktop computer; a PDA) may be readily substituted for telephone 35 as desired.

As previously stated, one of many aspects of the present invention is directed to a method for facilitating communication between a first person (e.g., an account holder) and a second person (e.g., a user) so that the first person may authorize a transaction between the second person and a third party (e.g., a merchant). In some embodiments, as discussed herein, communication may be enabled between a first person and a second person using a communication device such as the exemplary merchant telephone 20. Of course, other types of communication devices for communicating with the second person may be used in lieu of, or in addition to, the telephone 20. Also, various embodiments of the present invention do not require that a third party have a communication device that the second person can use. Thus, in some embodiments, a communication device 50 may be employed in lieu of, or in addition to, telephone 20, in order to facilitate communication between the second person and the first person. Communication device 50 may comprise (i) a telephone (e.g., a cellular or conventional telephone); (ii) a personal computer, such as one based on an INTEL® PENTIUM® or CENTRINO™ series processor; (iii) a Personal Digital Assistant (PDA); (iv) a pager; (v) a radio communication device; and/or (vi) any suitable communication device. Communication device 50 may be owned, operated by, operated on behalf of, and/or otherwise accessible to the second person (e.g., a user). Communication device 50 preferably is in communication with telecommunications network 25 via line 50A.

It is noted that the foregoing hardware may include well-known internal connectors, architectures, interfaces, ports, and communication devices (e.g., modems) to enable processing and communication. For the purpose of simplicity and clarity, a detailed description of the same is omitted.

Figure 2:
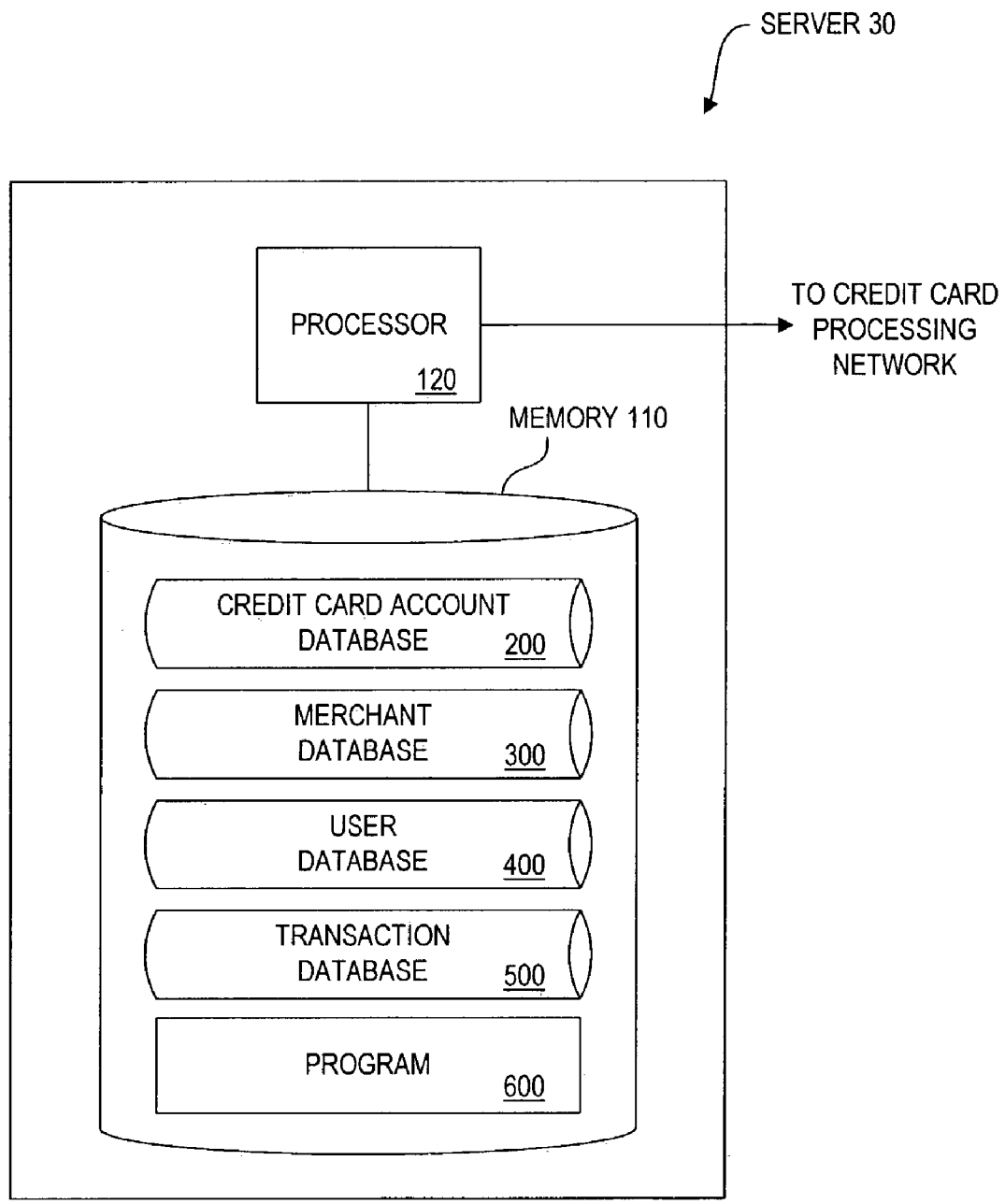
FIG. 2 is a diagrammatic representation of an exemplary server of the apparatus of FIG. 1.

Referring next to FIG. 2, a diagrammatic representation of an embodiment of server 30 is shown. Server 30 typically includes memory 110, and at least one processor 120 in communication therewith. Memory 110 typically includes one or more machine readable media. Such media include, as is well known in the art, an appropriate combination of magnetic, semiconductor and optical media. Memory 110 is preferably capable of supporting searching and storing of digital multimedia data such as text and audio. Memory 110 (or portions thereof) may reside on single computer, or may be distributed in a known manner among multiple computers that may be included in server 30.

In the present embodiment, memory 110 includes credit card account database 200, merchant database 300, and user database 400. Transaction database 500 may also be stored in memory 110 to provide additional functionality. Memory 110 also stores program 600, which includes instructions for controlling processor 120 in accordance with the present invention, and particularly in accordance with the process described herein.

The rows and columns of the databases described herein represent records and fields thereof, respectively. In the described embodiments, the databases are used in a relational arrangement, as is known in the art, so that the databases relate to one another by way of fields that store common data. It is noted that while the following description refers to specific individual databases, formats, records, and fields, those skilled in the art will readily appreciate that various modifications and substitutions may be made thereto without departing from the spirit and scope of the present invention.

Referring now to FIG. 3, an embodiment of credit card account database 200 is depicted in detail. Database 200 stores data relating to credit card accounts that are maintained for account holders. Each record (row) of database 200 represents such an account. For exemplary purposes, two records R1 and R2 are shown.

Field 200A stores an account identifier that is associated with and that uniquely identifies a credit card account. In this embodiment, the account identifier is a sixteen digit credit card account number, such as is commonly imprinted on a credit card. Thus, as is well known, the first four digits of each account number indicate the issuer of the credit card. The remaining twelve digits of each account number are used to uniquely identify an account. Of course, other types of account identifiers may be used as desired. According to an alternative embodiment, the account identifier need not uniquely identify a credit card account; a plurality of different account identifiers may be used to identify the same credit card account.

Field 200B may be used to store the name of an account holder. In one embodiment, the name stored in field 200B is a digital audio file (or a pointer thereto) that contains a pre-recorded audio sample of the account holder's name. Of course, an account holder's name may be stored in field 200B in another form, such as text.

Field 200C may be used to store the address of an account holder. Fields 200D and 200E may be used to store a credit line and available credit for an account, respectively.

Referring next to FIG. 4, an embodiment of merchant database 300 is depicted in detail. Database 300 stores data relating to one or more merchants 10 with whom a user may execute transactions. One record (row) of database 300 is maintained for each merchant 10. For exemplary purposes, two records R3 and R4 are shown.

Field 300A stores a merchant identifier that uniquely identifies a merchant 10. For exemplary purposes, the merchant identifier is shown as including five digits.

Field 300B may be used to store a CAT identifier that identifies a particular CAT 15 of merchant 10. Field 300C stores a telephone number for a telephone 20 that is accessible by a user. In this embodiment, telephone 20 is located at the point-of-sale and is in close proximity to CAT 15 that is identified by the CAT identifier stored in field 300B.

Field 300D may be used to store a name of a merchant 10. The name may be stored in the form of a digital audio file (or a pointer thereto) that contains a pre-recorded audio sample of the name of merchant 10. Of course, a merchant's name may be stored in field 300B in another form, such as text.

Referring next to FIG. 5, an embodiment of user database 400 is depicted in detail. Database 400 stores data that enables an account holder to communicate with a user to determine at least a portion of the circumstances surrounding a transaction that is being executed by the user. One record (row) of user database 400 is maintained for each credit card that is associated with a credit card account represented by a record in database 200. For exemplary purposes, two records R5 and R6 are shown. Of course, more than one record may be maintained for each credit card.

Field 400A stores a user identifier that is associated with and that uniquely identifies a credit card that is associated with a credit card account represented by a record in database 200. In this embodiment, the identifier stored in field 400A is a sixteen digit credit card account number, such as the type commonly imprinted on a credit card. The user identifier need not be associated with nor uniquely identify a credit card that is associated with the credit card account. For example, the user identifier may be directly associated with the credit card account. As will be described in more detail below, a user uses the credit card identified by the identifier stored in field 400A to execute a transaction with a merchant 10. Field 400B stores an account identifier that is associated with and that uniquely identifies a credit card account to which the credit card identified by the user identifier stored in field 400A is linked.

In this embodiment, the user identifier stored in field 400A is made to differ from the account identifier stored in field 200A so that the presentation of a user identifier would initiate transaction process 601. Preferably, the length of the user identifier is the industry standard length of sixteen digits. Of course, the user and account identifiers stored in fields 400A and 200A may be designed to be the same. In this case, field 400B would not be necessary.

Field 400C stores a fee that is charged to the balance of the account holder's account for each transaction initiated by the presentation of user identifier 400A. The fee may be determined in a number of different ways. For example, the fee may be based on the amount of time that an account holder communicates with a user or it may be a fixed dollar amount that is charged to the balance each time that a credit card is used by a user. In another embodiment, the fee may be charged on a periodic basis—e.g., each year, regardless of the number of times that a credit card is used. In still another embodiment, the fee may be a percent of the transaction amount. In any of these embodiments, the fee also may be made to vary in accordance with the type of credit card. For example, if a credit card is a "gold" card, then a $25 annual fee may be charged. Alternatively, if a credit card is a "platinum" card, there may be no associated fee.

Field 400D may be used to store the name of a user. The name stored in field 400D may be a digital audio file (or a pointer thereto) that contains a prerecorded audio sample of the user's name. Alternatively, a user's name may be stored in field 400D in another form, such as text.

Field 400E is used to store a telephone number of a telephone 35. In the present embodiment, it is the telephone number of an account holder. In alternate embodiments, it may be a telephone number of another person, such as a relative of the user.

Field 400F may be used to store a length of time (e.g., a number of minutes) that an attempt will be made to contact an account holder (or other person) at telephone 35 using the telephone number stored in field 400E. If this time elapses, a default command stored in field 400G may be executed. In one embodiment, the default command indicates whether a transaction should be authorized or declined in the event that the account holder (or other person) cannot be contacted.

In addition, or alternatively, user database 400 may include information about criteria for the circumstances under which the account holder should or should not be contacted, or under which the account holder must provide authorization. For example, such criteria may include certain classes of merchants (by Standard Industrial Classification ("SIC") code and/or Merchant Category Code ("MCC")) with whom the transaction is made, a maximum amount of money charged to the card, and/or a time period in which the transaction occurs.

FIG. 6 depicts, in detail, an embodiment of transaction database 500. Database 500 may be used to store data relating to transactions executed by a user using a credit card that is associated with an account stored in database 200. It may also be used to store data relating to conventional transactions involving other credit cards. For exemplary purposes, three records R7-R9 are shown.

Field 500A is used to store either a user identifier or an account identifier. If a record represents a transaction between a user and merchant 10 in which a credit card that is associated with a credit card account represented by a record in database 200 was used, then a user identifier stored in field 500A identifies that credit card, as described above with reference to field 400A (FIG. 5). Records R7 and R8 represent such records. If a record represents a transaction between an account holder and a merchant using another credit card, then the identifier stored in field 500A represents the credit card number of that credit card. Record R9 represents such a record.

Field 500B stores an authorization code that is generated in a well-known manner by server 30 when it authorizes a transaction. Field 500C stores a record of charge identifier that is printed on a receipt and used to help the user and/or the account holder identify the transaction. The identifier stored in field 500C is generated by server 30 in a well-known manner. Field 500D stores either a dollar amount spent by a user for a transaction or a fee that is to be charged to the credit card account, the latter of which is described with reference to field 400C (FIG. 5).

Field 500E may be used to indicate whether the value stored in field 500D represents such a dollar amount or a fee. As shown in record R7, if the charge description stored in field 500E indicates a name of a merchant 10 (e.g., "ABC Drug Store"), then the amount stored in field 500D represents a transaction amount, here, $250.38. For example, as shown in record R8, if the charge description stored in field 500E indicates "Emergency Card Usage Fee," then the amount stored in field 500D represents a fee—e.g., $20.00. Fields 500F and 500G store a merchant identifier and a CAT identifier, respectively, as described above with reference to field 300A and 300B.

It is noted that given a first record relating to a transaction, a second record relating to an associated fee may be determined. This is because the first and second records will have identical user identifiers stored in field 500A. Thus, for example, record R7 represents a transaction for "$250.38" and record R8 represents an associated "$20.00" usage fee.

Consequently, both records R7 and R8 have the same user identifiers—i.e., "2222-3333-4141-151."

Figure 7A:
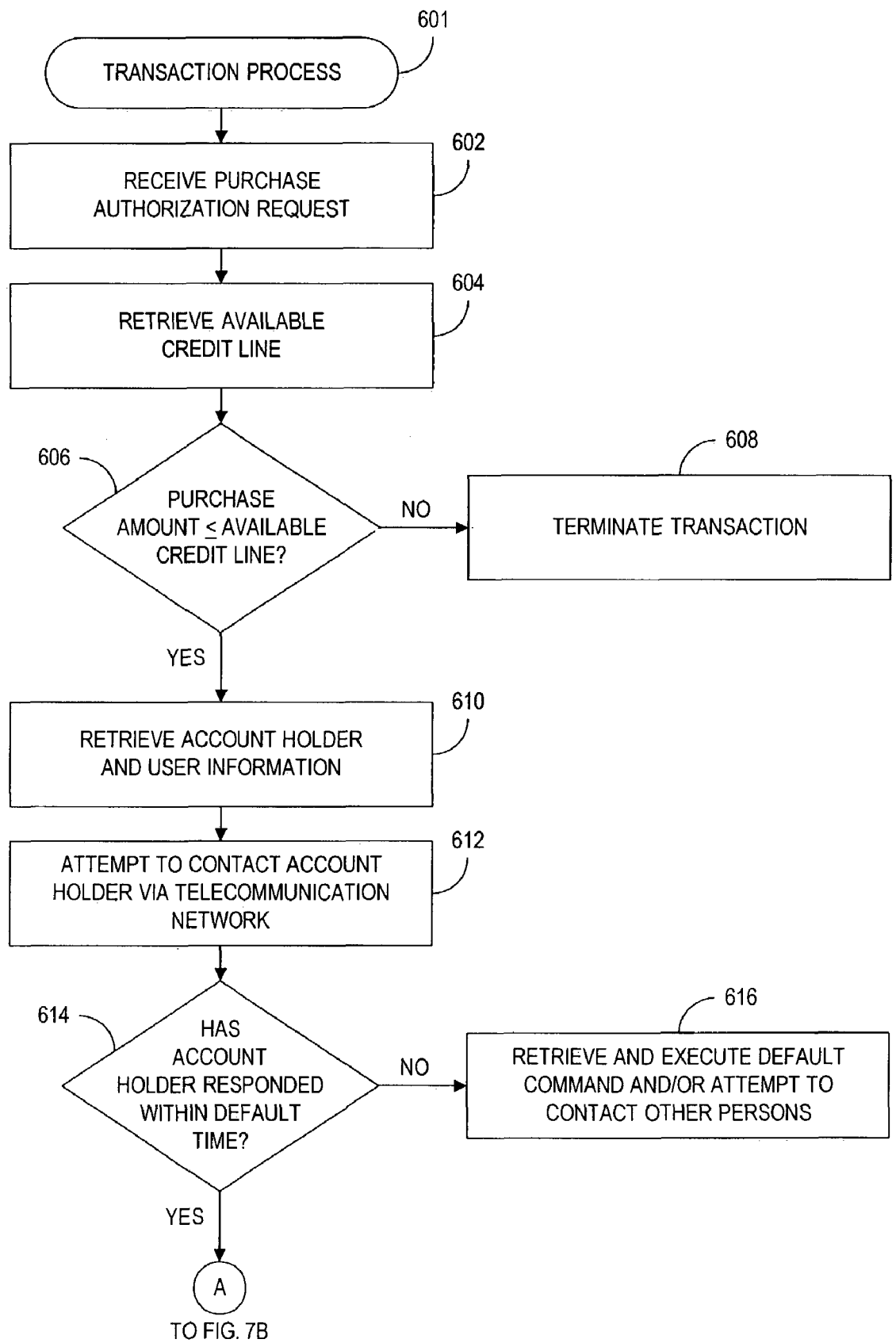
FIGS. 7A and 7B illustrate an exemplary process for processing a credit card transaction and for facilitating communication between first and second persons.
Figure 7B:
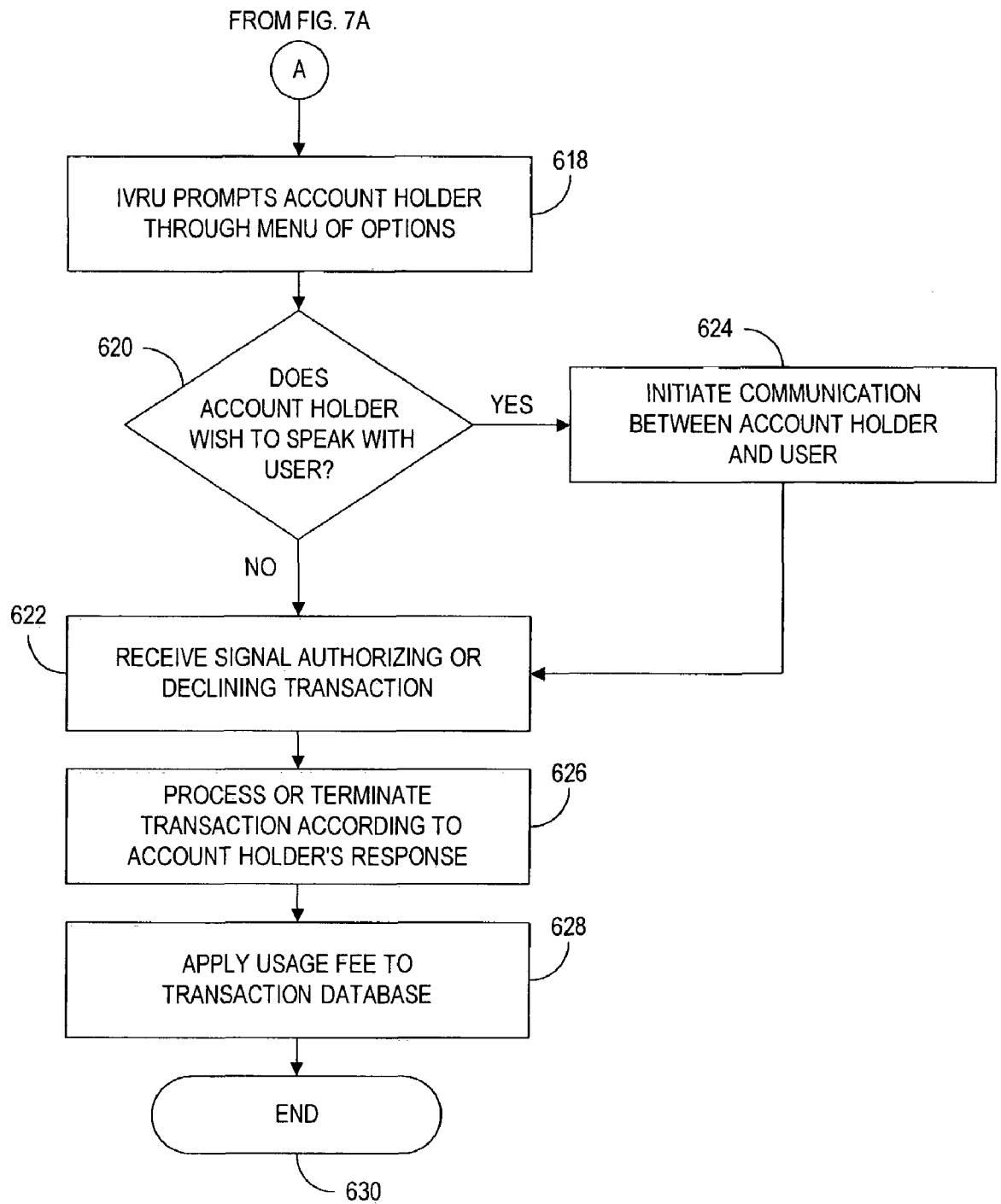

Referring again to FIG. 2, memory 110 also includes program 600. Program 600 comprises computer instructions and/or data, executable or otherwise, for performing the functionality of the present invention. FIGS. 7A and 7B depict process 601 that may be embodied by such a program 600 for processing a credit card transaction and facilitating communication between first and second persons so that the first person may authorize a transaction between the second person and a merchant.

Prior to execution of process 601 it is contemplated that an account holder and a user have been associated with a credit card account for which a record is maintained in database 200 (FIG. 3). This may be accomplished via a registration-type process whereby a user is registered with a credit card such that transactions executed with the credit card will affect the balance of the account holder's account.

At step 602, a user begins to execute a transaction with a merchant 10. To do this, the user presents a credit card that is associated with an account stored in database 200 (FIG. 3) to a merchant 10 for payment. The credit card has an identifier imprinted thereon and/or encoded therein, which corresponds to a user identifier stored in field 400 of database 400 (FIG. 5).

Using conventional techniques, merchant 10 uses CAT 15 to transmit a purchase authorization request to server 30 via line 15A, telecommunications network 25, line 32A, telecommunications switch 32, and line 30A (FIG. 1). In this embodiment, the request includes data indicating a purchase amount for the goods, an identifier that identifies the credit card that the user is using for payment, an identifier that identifies merchant 10, and an identifier that identifies CAT 15 from which a purchase authorization request is being transmitted. The purchase authorization request may be routed through a credit card processing network (not shown) to server 30 in a well-known manner. Server 30 receives the purchase authorization request from CAT 15.

At step 604, processor 120 of server 30 accesses the record in user database 400 whose field 400A corresponds to the identifier that identifies the credit card that was received at step 602. Processor 120 retrieves the account identifier stored in field 400B for the accessed record. Processor 120 accesses the record in credit card account database 200 for the retrieved account identifier and retrieves the available credit stored in field 200E. At step 606, if the available credit stored in field 200E is determined to be less than the purchase amount received at step 602, then the transaction is terminated at step 608 and process 601 is complete.

If the available credit stored in field 200E is determined at step 606 to be greater or equal to the purchase amount received at step 602, then processing continues. At step 610, processor 120 retrieves the name of the user and the account holder's telephone number from fields 400D and 400E, respectively, for the record in user database 400 that was accessed at step 604. Processor 120 also retrieves the name of the account holder from field 200B for the record in credit card account database 200 that was accessed at step 604.

An inquiry is made whether the account holder desires to communicate with the user. In this embodiment, at step 612, the telephone number retrieved at step 610 is used by IVRU 34, under control of processor 120 and telecommunications switch 32, to attempt to connect the account holder. Thus, IVRU 34 places a telephone call to telephone 35 using that telephone number in a conventional manner.

At step 614, it is determined whether the account holder has been contacted. If the account holder has not been contacted, then a feature of the present invention may be executed at step 616. In accordance with this feature, if the account holder cannot be contacted within the period of time specified in field 400F for the record in user database 400 accessed at step 604, then the default command stored in field 400G for that record is retrieved and executed. Thus, if the retrieved default command is "AUTHORIZE," then processor 120 will authorize the transaction in a conventional manner. Alternatively, if the retrieved default command is "DECLINE," then processor 120 will decline the transaction in a conventional manner. If this feature is not included and the account holder cannot be contacted, then the transaction may be terminated. If it is determined at step 614 that the account holder has been contacted, then at step 618 processor 120 instructs IVRU 34 to present a list of options to the account holder. For example, IVRU 34 may cause the following message to be played to the account holder: "Hello Mr.Johnson, you have a transaction authorization request from JoeSmith for $250.38 at ABCDrugStore. Press 1 if you wish to authorize this transaction. Press 2 if you wish to decline this transaction. Press 3 if you wish to talk with JoeSmith." The underlined text may be played by IVRU 34 to the account holder by accessing the relevant voice files, or other data in the case of a monetary amount, in the appropriate databases. The account holder responds by depressing the number "1," "2," or "3" on the keypad of telephone 35 and a signal indicative of the response is transmitted to server 30 in a conventional manner. In an alternate embodiment, the list of options may be presented to the account holder by a human operator.

At step 620, processor 120 determines whether the account holder desires to communicate with the user. If processor 120 received a signal indicating that the user depressed the number "1" or "2" on his keypad, then the account holder does not desire to communicate with the user and processing continues at step 622.

If processor 120 received a signal indicating that the user depressed the number "3" on his keypad, then the account holder does desire to communicate with the user. In this case, at step 624, processor 120 enables or initiates communication between the account holder and the user. In this embodiment, processor 120 accesses the record in merchant database 300 whose field 300B corresponds to the CAT identifier that was included in the purchase authorization request received at step 602. Processor 120 retrieves the telephone number stored in field 300C for that record.

The retrieved telephone number is used by IVRU 34, under control of processor 120 and telecommunications switch 32, to place a telephone call to the user at telephone 20 in the proximity of CAT 15. The method and apparatus disclosed in U.S. Pat. No. 5,319,701, incorporated herein by reference, may be used to establish connection between telephone 35 and telephone 20 so that the account holder may communicate with the user before authorizing or declining the transaction at step 622.

In some embodiments, the processor 120 may enable or initiate communication between the account holder and the user by accessing one or more second person communication addresses, which may be stored in the user database 400. Exemplary second person communication addresses include, but are not limited to, (i) telephone numbers, (ii) pager numbers, (iii) Internet Protocol addresses, (iv) email addresses, and/or (v) instant or text messaging addresses (e.g., AMERICA ONLINE® INSTANT MESSENGER™ addresses). Other types of addresses will be readily understood by those skilled in the art in light of the present disclosure. In some embodiments, a second person communication address may comprise an identifier that identifies the second person communication device 50 (e.g., a telephone number if the communication device is a telephone). The processor 120 may then, in turn, use one or more of the second person communication addresses to establish communication between the account holder and the user via the second person communication device 50. In some embodiments, the processor 120 may provide the second person communication address to the first person so that the first person can contact the second person.

Embodiments featuring a communication device 50 may be desirable in situations where a merchant phone 20 or other third-party communication device is not available, such as where the merchant does not have a phone in close proximity to the merchant CAT 15, or where the merchant does not wish to let customers use the merchant phone 20. Further, embodiments featuring a communication device 50 may be desirable in situations where the merchant is geographically remote from the user. For example, where a user attempts to purchase a product from a remote merchant over the phone or through the Internet (e.g., via a merchant's Website), communication may be enabled or initiated between the account holder and the user using a communication device 50 (e.g., by initiating an instant messaging session on the user's computer).

The account holder and the user may communicate to discuss the circumstances surrounding the transaction. For example, consider an account holder who has a parental relationship with the user. Further consider that the parent permitted the child to use the credit card only in cases of emergency. In such an instance, the parent and child may communicate to discuss the nature of the emergency. In one embodiment, processor 120 is configured to track the duration of the communication so that a fee can be charged to the financial account based on the duration.

At step 622, based on the communication, the account holder can authorize or decline the transaction using telephone 35. To do so, the account holder depresses the number "1" or "2" on the keypad of telephone 35. A signal indicative of that response is transmitted to server 30 in a conventional manner at which point the command is executed. In an alternate embodiment, the account holder may enter a personal identification number via the keypad of telephone 35 in order to authorize or decline the transaction. In this case, the signal transmitted to server 30 comprises a personal identification number. At step 626, processor 120 continues processing the transaction in accordance with the response of the account holder at step 618 or 624. Thus, if the account holder authorized the transaction, then an authorization code is generated in a conventional manner, which is transmitted to CAT 15 that communicated the purchased authorization request to server 30 at step 602. The transaction database 500 is updated as follows: the identifier identifying the credit card, the purchase amount, the identifier identifying the merchant, and the CAT identifier received in the purchase authorization request at step 602 are stored in fields 500A, 500D, 500F, and 500G, respectively.

An authorization code is generated and stored in field 500B. The record charge identifier is stored in field 500C. The charge description is obtained from the merchant database 300 by reading field 300D for the record identified by the merchant identifier received in the purchase authorization request received at step 602.

At step 628, a record is also populated in the transaction database 500 to reflect the emergency charge. More specifically, the identifier identifying the credit card, the identifier identifying the merchant, and the CAT identifier received in the purchase authorization request at step 602 are stored in fields 500A, 500F, and 500G, respectively. The transaction usage fee is obtained from user database 400 and is stored in field 500D. An authorization code is generated and stored in field 500B. The record charge identifier is stored in field 500C. The charge description "Emergency Card Usage Fee" is stored in field 500E. Process 601 ends at step 630.

In an alternate embodiment, communication with merchant 10 may be terminated prior to accessing database 400 at step 610 to determine the telephone number of the account holder. In this way, processor 120 of server 30 may receive a signal from an account holder indicating whether to authorize the transaction. When the signal indicates that the transaction is to be authorized, processor 120 of server 30 may re-establish communication with merchant 10 and transmit an authorization code thereto. According to another embodiment of this invention, if the account holder has not been contacted at step 612, then processor 120 may instruct IVRU 34, under control of processor 120 and telecommunications switch 32, to attempt to contact another person (e.g., a relative of the user) who can authorize or decline the transaction. Also, the other person may be selected from among several people depending on the time of day that the data identifying the financial account and the third party is received. In this case, user database 400 may be modified in a well-known manner to include the name(s) and telephone number(s) of each person, as well as the time of day that a person is to be contacted if this latter embodiment is implemented. Each person may be contacted as described above with reference to the account holder and processing would proceed as if the person was the account holder.

In view of the foregoing, the present invention provides a method and apparatus in which an account holder can remotely control the authorization or denial of a card-based transaction executed by a user. The method and system enable the account holder to communicate with the user who is using a credit card to execute the transaction with a merchant. In this way, the account holder and the user can discuss the circumstances surrounding the transaction and the account holder can authorize or decline the transaction based on those circumstances. Various embodiments also allow the account holder to communicate with the merchant, the merchant's representative, or cashier. For example, the account holder may not trust the user to communicate the true circumstances of the transaction. Thus, the account holder is able to adequately control and manage charges made by users using credit cards that are associated with their accounts.

While the foregoing embodiments have been described with reference to a credit card and corresponding credit card account, it is contemplated that other types of transaction cards and financial accounts may be used. Such financial cards may include, for example, prepaid cards, debit cards and smart cards and their associated financial accounts. Also, some embodiments of the present invention may use accounts having redeemable points or other alternative currency (e.g., frequent flyer mile accounts, EBAY® ANYTIME POINTS™), or payment accounts (e.g., PAYPAL®) that may be linked to one or more financial accounts.

Other types of accounts, such as checking accounts, may also be used. For example, a checking account holder can control the authorization or denial of a transaction involving the use of a paper check or of a check guarantee card. Various embodiments of the present invention enable the account holder to communicate with the user who is using a check or check guarantee card to execute the transaction with a merchant. In this way, the account holder and the user (or merchant) can discuss the circumstances surrounding the transaction and the account holder can authorize or decline the transaction based on those circumstances.

It is contemplated that transaction cards such as a casino player tracking cards may also be used. For example, a casino player tracking card holder can control the use of the casino player tracking card for a transaction (e.g., play of a slot machine; presentation at a restaurant, casino, or hotel). Further, transaction cards need not be associated with a financial account. Cards corresponding to financial, membership, and/or identity accounts, such as health insurance cards, medical cards, automobile club membership cards, discount club membership cards, or health club cards, may also be used in various embodiments of the present invention, where the user seeks to use the card in a transaction (e.g., seeking automobile club services, seeking medical services).

Various embodiments of the present invention provide for enabling the designation of a person who can control the authorization or denial of a card-based transaction executed by a user. The controlling individual may be designated by the account holder, or, alternatively, by the issuer of the transaction card. The controlling individual may even control the authorization or denial of a card-based transaction where the account holder is seeking to use the card. For example, a relative of an ailing family member may be designated as a controlling individual in order to prevent the ailing or elderly family member from abuse or misuse of a financial account for which the ailing or elderly family member remains responsible. In another example, a parent may be designated as a controlling individual for a credit card account for which her son is the sole account holder. In this way, an account holder may enjoy many of the benefits of being an account holder, but a check remains in place against any potential abuse of the account by the account holder. A controlling individual may be an account holder. For example, a joint account holder may be a controlling individual with respect to another joint account holder. Also, more than one person may be designated as a controlling individual. Where more than one controlling individual is designated, consent may be required from only one controlling individual, from at least a minimum number of controlling individuals, or from all controlling individuals.

To illustrate still other alternate embodiments, consider that control of cash withdrawal at an Automatic Teller Machine (ATM) can be remotely authorized by the account holder upon presentation of the user identifier 400A at the ATM. In this embodiment, the communication between the account holder and the user can be facilitated using audio and/or video transmission. In an audio-based embodiment, communication may be facilitated using the above-referenced telephone connections. In a video-based embodiment, communication may be facilitated between a personal computer or video phone connected to the ATM network and the ATM. In this video embodiment, video images of the parties may be input through video cameras and transferred during the communication. The personal computer may use well-known video cameras, such as those commonly manufactured by Intel Corp. The ATM may use its resident security camera. As such, the account holder is able to see a graphical image of the user on the screen of the account holder's personal computer during the transaction to ensure that the user presenting a card having user identification number 400A is in fact authorized.

Thus, although the particular embodiments shown and described above are useful in many applications relating to the arts to which the present invention pertains, further modifications of the present invention herein disclosed will occur to persons skilled in the art. All such modifications are deemed to be within the scope and spirit of the present invention as defined by the appended claims.

We claim:

1. A method comprising:
   associating a first person with an account;
   associating a second person with the account;
   receiving a request to authorize a transaction between the second person and a third party;
   determining whether the first person desires to communicate with the second person;
   determining at least one communication address; and
   enabling communication between the first person and the second person based on the at least one communication address if the first person desires to communicate with the second person.

2. The method of claim 1, in which determining whether the first person desires to communicate with the second person comprises:
   receiving from the first person an indication that the first person desires to communicate with the second person.

3. The method of claim 1, further comprising:
   receiving a signal from the first person, the signal comprising an indication of whether to authorize the transaction; and
   processing the transaction based on the signal.

4. The method of claim 1, further comprising:
   receiving a first signal from the first person, the first signal indicating whether to authorize the transaction; and
   transmitting a second signal to the third party, the second signal indicating whether the transaction is authorized.

5. The method of claim 1, further comprising:
   receiving data including an identifier that identifies the account.

6. The method of claim 5, in which the identifier comprises at least one of:
   a credit card number,
   a casino player tracking number,
   a checking account number
   a smart card number,
   a frequent flyer account number,
   a payment account number, and
   a debit card number.

7. The method of claim 1, in which the account is a credit card account.

8. The method of claim 1, in which the first person is a controlling individual.

9. The method of claim 1, in which the first person is a joint holder of the account.

10. The method of claim 1, in which the first person is an account holder of the account.

11. The method of claim 1, in which the third party is an automatic teller machine.

12. The method of claim 1, further comprising:
    determining a fee based on the transaction; and
    charging the fee to the account.

13. The method of claim 1, in which associating the second person comprises:
    associating the second person with a credit card, in which the credit card corresponds to the account, and in which the first person owns the account.

14. The method of claim 1, further comprising:
    determining a duration of the communication;
    determining a monetary amount based on the duration; and
    charging the monetary amount to the account.

15. The method of claim 1, in which enabling communication comprises:
    enabling communication between the first person and the second person via a device that is associated with the third party.

16. The method of claim 1, in which enabling communication comprises:
    enabling communication between the first person and the second person via a device that is associated with the second person.

17. The method of claim 1, in which enabling communication comprises:
    enabling communication between the first person and the second person via a device that comprises at least one of:
    a telephone,
    a pager,
    a radio device,
    a personal digital assistant, and
    a computer.

18. The method of claim 1, in which enabling communication comprises:
    enabling text-based communication between the first person and the second person.

19. The method of claim 1, in which enabling communication comprises:
    enabling at least one of audio communication and video communication between the first person and the second person.

20. The method of claim 1, in which enabling communication comprises:
    enabling telephonic communication between the first person and the second person.

21. The method of claim 1, in which the at least one communication address comprises at least one of:
    a communication address that is associated with the first person,
    a communication address that is associated with the second person,
    a communication address that is associated with the third party,
    a telephone number,
    a pager number,
    an Internet protocol address,
    an instant messaging address, and
    an email address.

22. A method comprising:
    receiving an indication of a first person;
    associating the first person with a financial account;
    receiving an indication of a second person;
    associating the second person with the financial account;
    receiving an identifier that identifies the financial account;
    receiving a request to authorize a transaction between the second person and a third party;
    determining a first communication address that is associated with the first person based on the identifier that identifies the financial account;
    establishing a connection to the first person based on the first communication address;
    determining whether the first person desires to communicate with the second person; and
    if the first person desires to communicate with the second person:
        determining a second communication address that is associated with the second person; and
        enabling communication between the first person and the second person based on the second communication address.

* * * * *